(12) United States Patent
Mullooly et al.

(10) Patent No.: US 8,127,442 B2
(45) Date of Patent: Mar. 6, 2012

(54) COMPRESSOR BLADE FLOW FORM TECHNIQUE FOR REPAIR

(75) Inventors: John F. Mullooly, Stafford Springs, CT (US); William M. Rose, Warren, MA (US); David R. Malley, Bolton, CT (US); Monika D. Kinstler, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 214 days.

(21) Appl. No.: 11/303,579

(22) Filed: Dec. 15, 2005

(65) Prior Publication Data

US 2009/0320287 A1 Dec. 31, 2009

(51) Int. Cl.
*B23P 6/00* (2006.01)
(52) U.S. Cl. .............. 29/889.1; 29/402.09; 29/402.11; 29/402.18; 29/402.21; 29/889.7
(58) Field of Classification Search ............. 29/402.01, 29/402.09, 402.13, 402.16, 402.18, 402.19, 29/402.21, 889.1, 402.11, 889.7; 228/119
See application file for complete search history.

(56) References Cited

U.S. PATENT DOCUMENTS

| | | | |
|---|---|---|---|
| 2,680,286 A | 6/1954 | Willgoos | |
| 2,987,806 A * | 6/1961 | Pekarek | 29/889.7 |
| 3,058,202 A * | 10/1962 | Stalker | 29/889.72 |
| 3,574,924 A * | 4/1971 | Dibble | 228/119 |
| 4,188,811 A | 2/1980 | Brimm | |
| 4,383,426 A * | 5/1983 | Legge | 72/63 |
| 4,855,011 A * | 8/1989 | Legge et al. | 156/583.1 |
| 4,904,528 A * | 2/1990 | Gupta et al. | 428/336 |
| 5,099,573 A * | 3/1992 | Krauss et al. | 29/889.72 |
| 5,288,209 A * | 2/1994 | Therrien et al. | 416/193 R |
| 5,451,142 A | 9/1995 | Cetel et al. | |
| 5,732,467 A * | 3/1998 | White et al. | 29/889.1 |
| 5,993,976 A * | 11/1999 | Sahoo et al. | 428/472 |
| 6,049,978 A * | 4/2000 | Arnold | 29/889.1 |
| 6,095,755 A * | 8/2000 | Houston | 416/241 R |
| 6,418,619 B1 * | 7/2002 | Launders | 29/889.7 |
| 7,343,676 B2 * | 3/2008 | Ng | 29/889.1 |
| 2003/0101587 A1 * | 6/2003 | Rigney et al. | 29/889.1 |
| 2004/0031140 A1 | 2/2004 | Arnold et al. | |
| 2005/0241147 A1 | 11/2005 | Arnold et al. | |

FOREIGN PATENT DOCUMENTS

| | | |
|---|---|---|
| EP | 1629929 A1 | 3/2006 |
| GB | 1269598 | 4/1972 |
| JP | 03115701 A * | 5/1991 |

OTHER PUBLICATIONS

European Office Action dated Sep. 15, 2009.

* cited by examiner

*Primary Examiner* — David Bryant
*Assistant Examiner* — Ryan J Walters
(74) *Attorney, Agent, or Firm* — Bachman & LaPointe, P.C.

(57) ABSTRACT

A method for repairing a turbine engine component is provided. The method broadly comprises the steps of providing a turbine engine component having an airfoil portion, applying a coating to the airfoil portion, and restoring a tip portion, a chord, and surfaces of the airfoil portion to original dimensions in a single operation. A system for repairing the turbine engine component is also described.

8 Claims, 3 Drawing Sheets

COMPRESSOR BLADE FLOW FORM TECHNIQUE FOR REPAIR

BACKGROUND OF THE INVENTION (1) Field of the Invention

The present invention relates to a method and a system for restoring the dimensional features of an engine run airfoil such as a compressor blade or vane.

(2) Prior Art

Conventional methods for restoring the dimensional features of an engine run airfoil involve the machining of dimensions using various applicable methods such as milling and grinding.

Despite the existence of these conventional methods, there remains a need for a method which is simple, repeatable, and quick to perform.

SUMMARY OF THE INVENTION

In accordance, a method for repairing a turbine engine component is provided. The method broadly comprises the steps of providing a turbine engine component having an airfoil portion, applying a coating to the airfoil portion, and restoring a tip portion, a chord, and surfaces of the airfoil portion to original dimensions in a single operation.

Further in accordance with the present invention, a system for repairing a turbine engine component is provided. The system broadly comprises means for applying a coating to an airfoil portion of the turbine engine component and means for simultaneously restoring a tip portion, a chord, and surfaces of the airfoil portion to original dimensions in a single operation.

Other details of the compressor blade flow form technique for repair, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
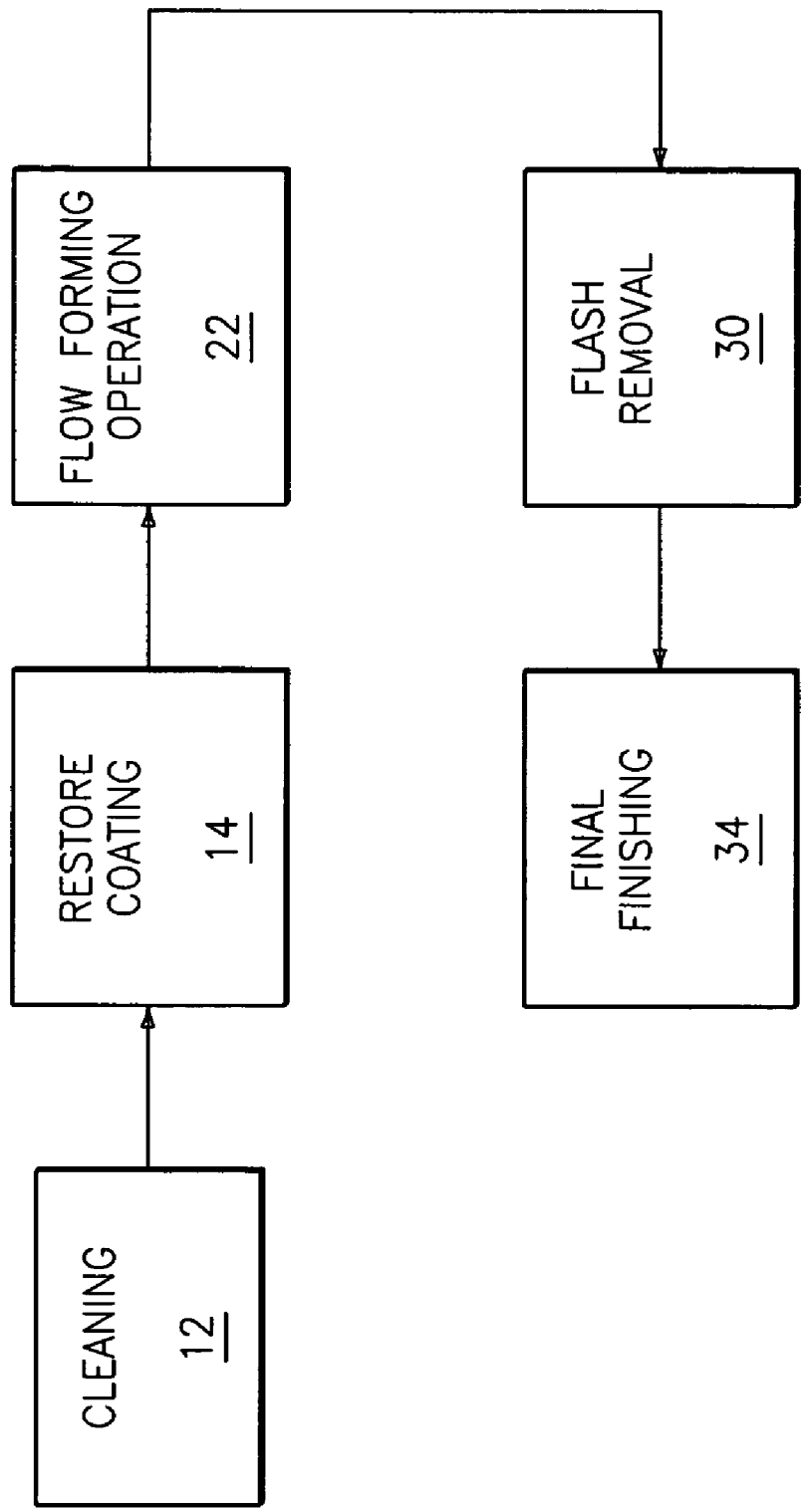
FIG. 1 is a flow chart showing the steps of the repair method of the present invention.

As noted above, the present invention relates to the repair of turbine engine components such as compressor blades and vanes which have been in service. FIG. 1 is a schematic illustration of the repair method of the present invention. As shown therein, the turbine engine component 10 is first cleaned in step 12. The turbine engine component 10 may be cleaned using any suitable cleaning treatment known in the art. As part of the cleaning treatment, any coating on the airfoil portion of the component 10 may be removed using any suitable technique known in the art.

Figure 2:
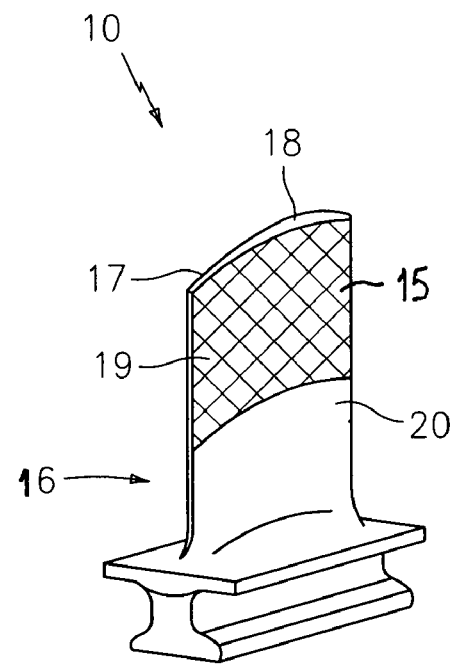
FIG. 2 is an illustration of a turbine engine component which has been through a coating operation.

In step 14, a coating 15 may be applied to restore the airfoil portion 16 of the turbine engine component. The coating 15 may comprise any suitable coating known in the art and may be applied using any suitable technique known in the art. For example, the coating 15 could be a titanium based coating. As shown in FIG. 2, preferably both surfaces 17 and 19 of the airfoil portion 16 are coated over a region from the tip portion 18 to about a mid-span location 20. At the mid-span location 20, the coating 15 may be blended into the surface of the airfoil portion 16 using any suitable technique known in the art.

Figure 3:
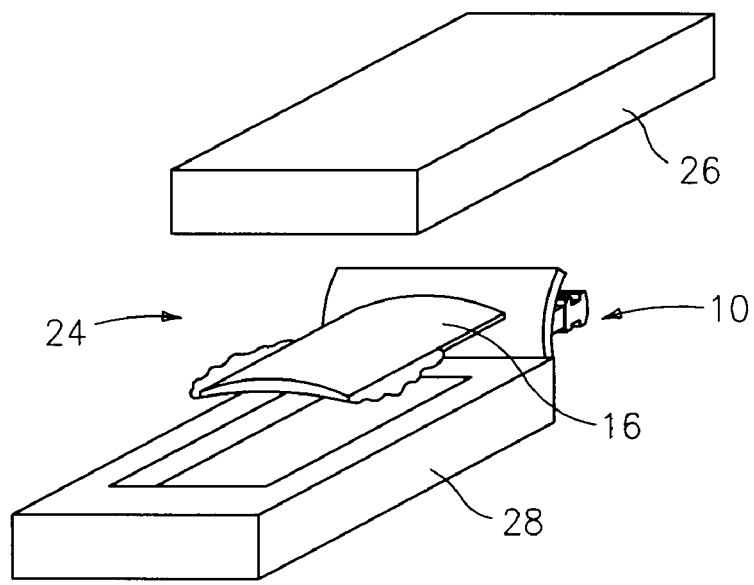
FIG. 3 is an illustration of a flow form die.
Figure 4:
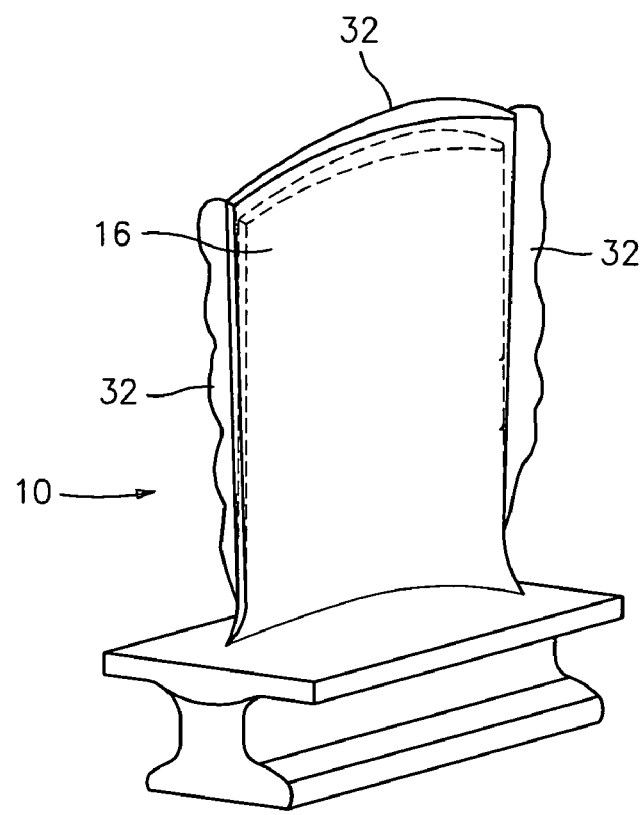
FIG. 4 is an illustration of a turbine engine component which has been through the flow form die operation.

In step 22, the airfoil portion 16 of the turbine engine component 10 is placed into a die set 24 such as that shown in FIG. 3 and subjected to a flow forming operation. The flow forming operation may be performed within a temperature range bounded on the low end by the creep behavior of the specific titanium alloy and on the high side by the beta transus of the alloy. The upper temperature limit is driven by the need to avoid grain growth. Die lubrication in the form of boron nitride or other materials can be used to facilitate separation of the titanium article from the die sections. The die set 24 has a first die half 26 which has the shape of one surface of the airfoil portion 16 and a second die half 28 which has the shape of the other surface of the airfoil portion 16. In the die set 24, the material added to the surface of the turbine engine component 10 as a result of the coating operation is subjected to heat and flow formed into a desired shape, such as causing the airfoil portion 16 to be restored to its original shape and dimensions. FIG. 4 illustrates the restored airfoil portion 16 after the turbine engine component 10 is removed from the die set 24. As can be seen therein, the three distress modes of tip restoration, chord restoration, and surface thickness restoration have been restored. After the flow forming operation has been completed the airfoil portion 16 of the turbine engine component 10 is removed from the die set 24.

Figure 5:
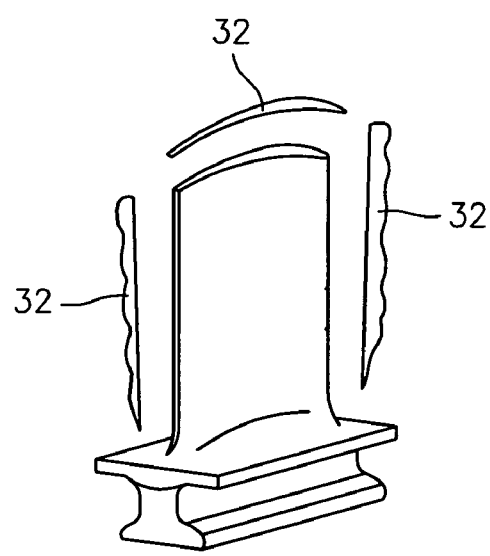
FIG. 5 illustrates flash being removed from a turbine engine component that has been restored to its dimensional features.

In step 30, and as shown in FIG. 5, the flash 32 around the airfoil portion 16 is then removed. The flash 32 may be removed using any suitable technique known in the art. For example, the flash 32 may be removed by machining the flash using any suitable technique known in the art.

In step 34, the turbine engine component is subjected to a final finishing operation. The final finishing operation may be performed using any suitable technique known in the art. For example, the turbine engine component may be subjected to glass bead peening to improve high cycle fatigue life.

The flow form technique described herein forces material in a die that has the benefit of restoring dimensions back to original in a very quick and repeatable method. Flow forming has the potential to possess improved fatigue properties over conventionally machined surfaces. Material properties of the flow formed turbine engine component are better than restoration repairs that utilize weld material. Any imperfections generated in the coating process will be subsequently corrected during the flow form operation.

Flow forming has the novel feature of restoring all three typical distress modes in a single operation. These distress modes include tip restoration, chord restoration, and surface thickness.

The repair method of the present invention has numerous advantages. It is simple to perform, repeatable, and quick. The repair method also corrects coating imperfections and restores all distress modes in a single operation. Still further, the repair method improves mechanical and fatigue properties of the turbine engine component and produces repairs with parent material properties.

While the method of the present invention has been described as being used in the context of repairing turbine engine components that have been in service, it could also be used to repair newly manufactured components that have one or more defects.

It is apparent that there has been provided in accordance with the present invention a compressor blade flow form technique for repair which fully satisfies the objects, means, and advantages set forth hereinbefore. While the present invention has been described in the context of specific embodiments thereof, other unforeseeable alternatives, modifications and variations will become apparent to those skilled in the art having read the foregoing description. Accordingly, it is intended to embrace those unforeseeable alternatives, modifications, and variations as fall within the broad scope of the appended claims.

What is claimed is:

1. A method for repairing a turbine engine component comprising the steps of:
 providing a turbine engine component having an airfoil portion with a coating, a tip portion and two surfaces;
 removing said coating on the airfoil portion of said turbine engine component;
 applying a restoration coating to said two surfaces of said airfoil portion;
 said restoration coating applying step comprises applying said restoration coating to said two surfaces of said airfoil portion only from the tip portion to a mid-span portion of said airfoil portion;
 placing said turbine engine component with said applied restoration coating into a die set and simultaneously restoring the tip portion, a chord, and said two surfaces of said airfoil portion to original dimensions in a single flow forming operation and removing flash from said airfoil portion after said restoring step.

2. The method according to claim 1, wherein said restoring step comprises heating said coated airfoil portion in said die set to cause material to flow within said die set and thereby restore said tip portion, said chord, and said surfaces.

3. The method according to claim 1, wherein said restoration coating applying step comprises applying a titanium coating to said airfoil portion.

4. The method according to claim 1, further comprising blending said restoration coating into said surfaces of said airfoil portion prior to placing said turbine engine component into said die set.

5. The method according to claim 1, further comprising cleaning said turbine engine component prior to applying said restoration coating.

6. The method according to claim 1, further comprising subjecting said turbine engine component to a finishing operation after said flash removal step.

7. The method according to claim 1, wherein said turbine component providing step comprises providing a blade.

8. The method according to claim 1, wherein said turbine component providing step comprises providing a vane.

* * * * *